United States Patent [19]

Rebuffi et al.

[11] Patent Number: 5,302,962
[45] Date of Patent: Apr. 12, 1994

[54] ANTENNA SYSTEM PRODUCING A MILLIMETER WAVE BEAM HAVING A GAUSSIAN-LIKE DISTRIBUTION

[75] Inventors: Luigi Rebuffi, Sceaux, France; Manfred Thumm, Sindelfingen, Fed. Rep. of Germany

[73] Assignee: European Atomic Energy Community (Euratom), Plateau Du Kirchberg, Luxembourg

[21] Appl. No.: 688,502
[22] PCT Filed: Dec. 5, 1989
[86] PCT No.: PCT/EP89/01483
§ 371 Date: May 23, 1991
§ 102(e) Date: May 23, 1991
[87] PCT Pub. No.: WO90/06665
PCT Pub. Date: Jun. 14, 1990

[30] Foreign Application Priority Data

Dec. 5, 1988 [EP]  European Pat. Off. ........ 88120273.3

[51] Int. Cl.⁵ ............................................. H01Q 13/00
[52] U.S. Cl. ................................. 343/781 P; 343/772; 343/781 CA; 333/21 R
[58] Field of Search ............... 343/781 P, 781 R, 720, 343/772, 756, 840, 781 CA; 333/21 R, 21 A; H01Q 13/00

[56] References Cited

U.S. PATENT DOCUMENTS

| | | | |
|---|---|---|---|
| 3,235,870 | 2/1966 | Hannan | 343/756 |
| 4,596,047 | 6/1986 | Watanabe et al. | 343/840 |
| 4,697,272 | 9/1987 | Harvey | 372/96 |

Primary Examiner—Donald Hajec
Assistant Examiner—Hoanganh Le
Attorney, Agent, or Firm—Sughrue, Mion, Zinn, Macpeak & Seas

[57] ABSTRACT

An antenna system for producing a millimeter wave beam having a Gaussian distribution uses a high power source and a partial mode converter operatively coupled to the source and reviving from the source a $T_{m,n}$ mode wave which might either be $TE_{m,n}$ or $TM_{m,n}$. The converter delivers a mixture of modes including the mode $T_{m,n}$ at a relative power rate of 70 to 85% and at a relative phase 0, and at least one of the following additional modes, namely $T_{m,n-1}$ at a relative power rate of 10 to 20% and at relative phase $\pi$, and $TE_{m,n+1}$ at a relative power rate of 10 to 20% and at relative phase $\pi$. The mixture of modes is applied to a collimation reflector (3, 10), having a concentration point (5) constituting the antenna system outlet. The antenna system can convert any $T_{m,n}$ mode into a linearly polarized narrow beam of very high power (about 1 MW) and and of high frequencies above 100 GHz.

6 Claims, 2 Drawing Sheets

ANTENNA SYSTEM PRODUCING A MILLIMETER WAVE BEAM HAVING A GAUSSIAN-LIKE DISTRIBUTION

FIELD OF THE INVENTION

The invention relates to an antenna system producing a millimeter wave beam having a Gaussian-like distribution and using a high power source.

BACKGROUND OF THE INVENTION

Such sources, which are called cyclotron resonance masers, for example gyrotrons, have successfully been used for plasma build-up, profile control and resonance heating in the field of thermonuclear fusion research at power levels in the MW-range. The oscillation of these sources is in axially symmetric modes $TE_{On}$ or in high asymmetric modes ($TE_{mn}$) with $m >> 1$.

As future fusion devices are planned to be larger and to operate at higher magnetic fields, sources must be developed for higher frequencies (above 100 GHz) and higher microwave power. For these applications, it would be desirable to dispose of an axisymmetric narrow pencil-like beam with well defined linear polarization, as for example a $TEM_{OO}$ Gaussian beam. In fact, this kind of beam is not only required for efficient electron cyclotron resonant heating of a plasma, but also for low-loss high power millimeter wave transmission.

From IEEE Transactions Microw. Th. Techn., Vol. NTT-26 No. 5, 1978, page 332 to 334, a mode transducing antenna is known, having a corrugation by which a $TE_{On}$ mode is converted into a linearily polarized beam. However, the microwave radiation issuing from such an antenna still presents considerable sidelobes which reduce the energy concentration in the main lobe and increase the losses of the system.

The main object of the present invention is thus to reduce the energy dissipated in the sidelobes and to provide an axisymmetric, narrow, Gaussian-like main lobe.

According to a particular application of the present invention, the antenna system provides for an output radiation of the linear $TEM_{OO}$-mode type.

These objects are achieved according to the invention by the antenna system as defined in the attached claims.

The invention will now be described in greater detail by means of several embodiments and in relation to the attached drawings.

BRIEF DESCRIPTION FOR THE DRAWINGS

DESCRIPTION OF PREFERRED EMBODIMENTS

Although the invention applies indifferently to electric modes TE and magnetic modes TM, reference will be made hereafter in particular to TE modes.

The invention is based on the following common features for circular symmetric $TE_{m,n}$ modes, and in particular $TE_{On}$ modes:

a—all patterns have the same location of the minima between the sidelobes;

b—the maximum of the main lobe is close to the angular position corresponding to the n-th zero of the Bessel function $J_1(x)$;

c—the phase of the main lobe in the $TE_{On}$ mode series is alternating.

These properties allow the reduction of the inner and outer sidelobes of a given dominant $TE_{On}$ mode pattern by superimposing a convenient percentage of power in the modes $TE_{O,n-1}$ and $TE_{O,n+1}$ (both with opposite phase with respect to $TE_{On}$). The same rule applies also to any $TE_{m,n}$ mode. Experimentally, it has been shown that at the centre of the pattern, there is practically no radiative power (the main lobe is down by more than 30 dB) and that the sidelobe level is down also by more than 30 dB. It has further been observed that there is practically no cross-polarization which is a fundamental result, quite different from the starting rotating asymmetric modes.

Figure 1:
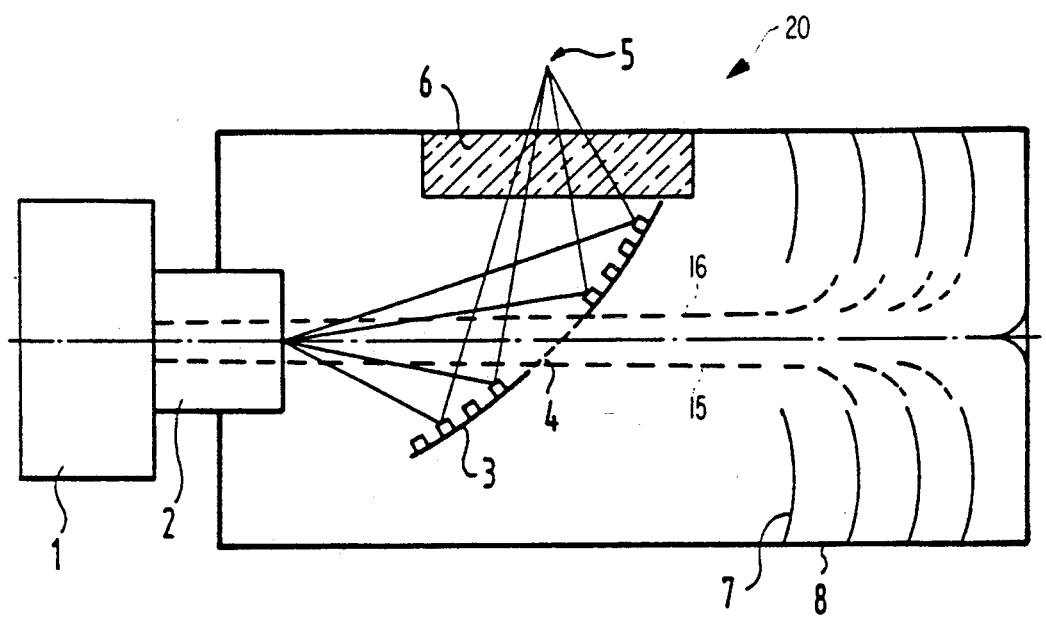
FIG. 1 shows schematically a preferred embodiment of the invention in a cross-sectional view.

Now reverting to FIG. 1, the system indicated generally at 20 comprises a high power microwave source (e.g. gyrotron) including a gun and cavity portion 1 able to release for example a beam at 140 GHz and at a power level of 1 MW. The microwave beam output by the source 1 is of the type $TE_{m,n}$. The values selected for m and n are for example 15 and 2 respectively. This microwave radiation is then converted in a partial mode converter 2 into a mixture of waves which still contains 70 to 85% of the dominant $TE_{m,n}$ mode and additionally small percentages between 10 and 20% of modes of the types $TE_{m,n-1}$ and $TE_{m,n+1}$. The mutual phase relationship is such that the additional modes are both in counterphase with respect to the dominant mode. Although the mixture of these three modes provides best results, the mixture of only two of them, the dominant mode at 80% and one of the additional modes at 20% power rate, provides beam characteristics which are only slightly worse.

The mixture of modes is then radiated to a collimation reflector 3 which is provided with a central hole 4 allowing the electron beam 15 of the gyrotron (issuing from the converter 2) to pass therethrough.

As it has been stated earlier, the mode mixture radiated by the converter 2 has an azimutal polarization with axial n-fold symmetry and the power is concentrated in a ring. Hence, this hole 4 does not increase the energy losses of the microwave radiation. Due to the fact that there are practically no sidelobes, the entire microwave energy is directed to the annular zone of the reflector 3. The reflector is shaped in such a way that the deflected radiation concentrates in a focus point 5 or, more generally, in a collimation zone around that point. The active surface 16 of the reflector 3 is corrugated in such a way that the radiated mode mixture having a circular electric field is converted into the linearily polarized $TEM_{OO}$ mode, which can be directly used as the propagation mode either in the free space or in an appropriate waveguide which is not shown.

The entire system 20 including the reflector 3 is enclosed in the gyrotron vacuum casing 8 and the microwave radiation issuing from the corrugated reflector 3 passes through a semicylindrical radiofrequency window 6 while the electron beam 15 is projected against a depressed collector 7 at the remote end of the casing 8.

Figure 2:
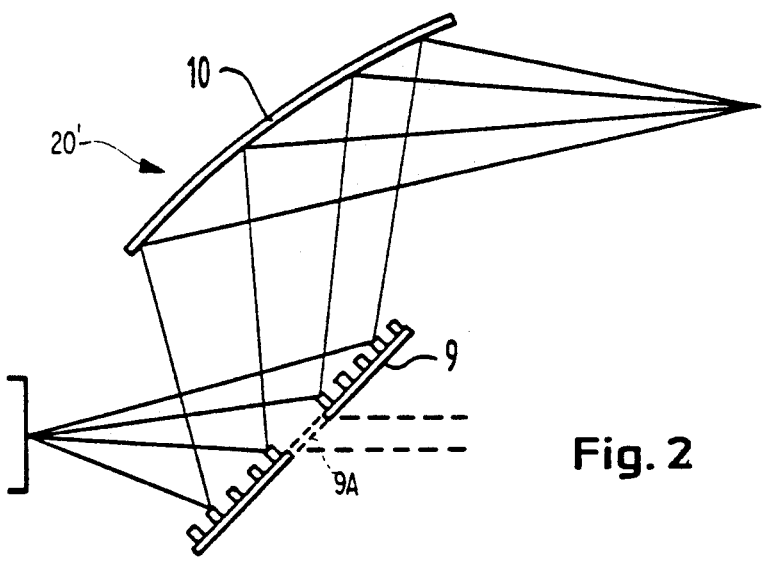
FIG. 2 represents a variant to the embodiment of FIG. 1.

An alternative antenna system 20' configuration with respect to FIG. 1 is shown in FIG. 2. In this case, the corrugated reflector is a plane reflector 9 of an annular disk shape, whereas the collimation is achieved by an additional reflector 10 which is disposed in the path of the microwave radiation downstream of the plane corrugated reflector 9 and outside of the casing 8 which is not shown here, but which is similar to that of FIG. 1 and is equipped with a collector for the electron beam of the gyrotron, and with a radiofrequency window.

Figure 3:
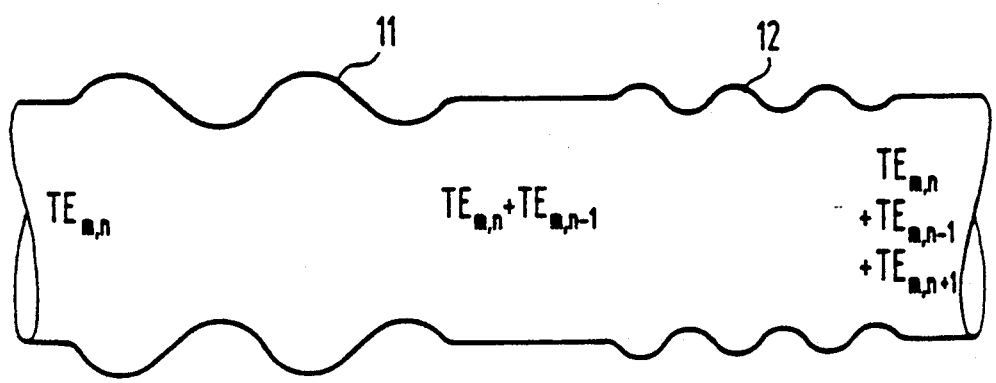
FIG. 3 shows schematically a partial mode converter used in the embodiments according to FIGS. 1 and 2.

FIG. 3 shows in more detail and at an enlarged scale the partial mode converter 2 in FIG. 1. This converter receives on the left hand side of the figure the radiation issued by the gyrotron, the microwaves being of the $TE_{m,n}$ mode type. The converter is composed in series of two partial mode converters constituted by rippled wall waveguide portions 11 and 12 respectively. The shape of the ripples of the two partial converters is different and allows in the first converter 11 a portion of say 15% of the incident wave to be converted into the $TE_{m,n-1}$ mode (in opposite phase with respect to the $TE_{m,n}$ mode), whereas in the downstream converter 12, a similar amount of energy of the basic mode is transformed into the mode $TE_{m,n+1}$ (also in opposite phase). The percentages of power converted in each converter depend on the length of the individual converters.

In order to reduce the size of the system, a compromise should be made between the oversizing of the partial mode converter and its length.

The distance between the radiating surface of the partial mode converter 2 and the reflector having the hole is chosen in order to have a sufficiently low power density on the surface of the reflector to avoid radio frequency break-down, and to have a sufficiently narrow field radiation to reduce the size of this reflector.

Figure 4:
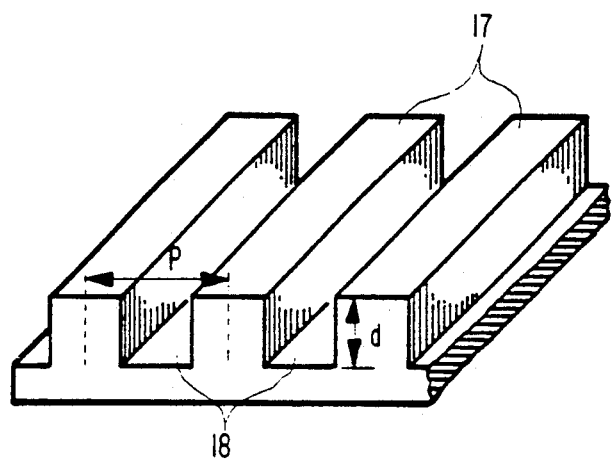
FIG. 4 is a detailed view on an enlarged scale of the corrugated surface of a reflector used in the embodiments of FIGS. 1 and 2.

FIG. 4 shows a detailed sketch of the corrugations of the reflector 3 or 9. The corrugations are shown here as straight line corrugations 17 for reasons of simplicity only. The pitch P of the corrugations 17 corresponds to about half the wavelength of the central operating frequency of the system. The depth d of the grooves 18 is about equal to a quarter wavelength at the same frequency.

The system 20 as shown in FIG. 1 and that at 20' FIG. 2 presents an expected efficiency, i.e. the ratio between the power collimated in the main lobe (in zone 5) having linear polarization and the power output of the gyrotron, of at least 95%.

Figure 5:
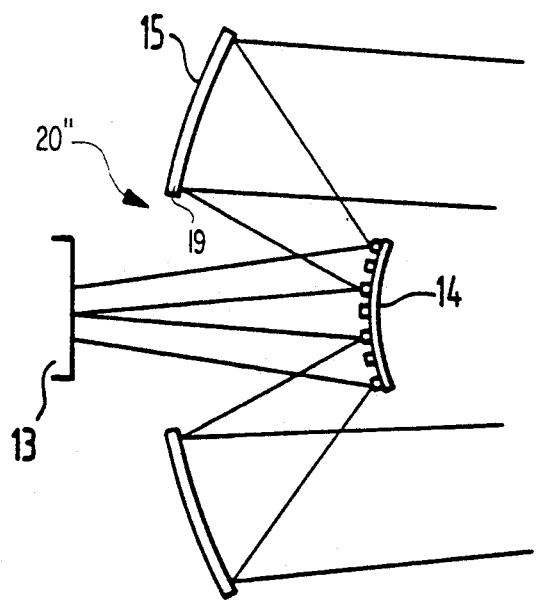
FIG. 5 shows an alternative configuration of reflectors for an antenna system according to the invention.

Another possible use of the device is in Cassegrain antenna system of the type described in US-A-3 235 870. FIG. 5 shows this application. The RF power radiated in a ring by a waveguide 13 is converted by a corrugated subreflector 14 into a linearly polarized beam and hence focussed by a main reflector 15. The latter has a hole 19 in the center in order to allow the installation of the waveguide 13.

The invention is not restricted to the embodiments described above.

In particular, it is possible to locate the casing 8 (FIG. 1) together with the partial mode converter 2 outside the microwave source 1, either close to its exit or close to the place where the microwave energy is used, while the gyrotron is located remote therefrom and connected thereto by conventional guides. If, in particular applications, the conversion of the microwave energy into the basic mode $TEM_{OO}$ is not required, of course, none of the reflectors 3, 9 and 19 (of FIGS. 1, 2, 5, respectively) must be a corrugated reflector.

If, in the course of the above description, reference has been made to a focus, this also includes the case of an infinite focus, or, in other words, of a parallel output beam.

We claim:

1. An antenna system for producing a millimeter wave beam having a Gaussian-like distribution, said system comprising: a high power source, a partial mode ocnverter operatively coupled to said source, said source comprising means for supplying to said partial mode converter a $T_{m,n}$ mode wave of the group consisting of $TE_{m,n}$ and $TM_{m,n}$, said partial mode converter comprising means for delivering a mixture of modes including a mode $T_{m,n}$ at a relative power rate of 70 to 85% and at a relative phase 0, and at least one additional mode of the group consisting of $T_{m,n-1}$ at a relative power rate of 10 to 20% and at a relative phase $\pi$, and $TE_{m,n+1}$ at a relative power rate of 10 to 20% and at a relative phase $\pi$, and said system further comprising means for applying said mixture of modes to collimation reflector having a focus concentration point constituting an antenna system outlet.

2. An antenna system according to claim 1, further comprising a corrugated reflector for converting an axially symmetric electric field of the incident wave into a linearly polarized Gaussian-like beam $TEM_{OO}$ mode and wherein said corrugated reflector is disposed in the path of the wave constituted by said mixture of modes at the outlet of said partial mode converter.

3. An antenna system according to claim 2, wherein the corrugated reflector is placed in the path of said wave along with the collimation reflector, and said collimation reflector is downstream of said corrugated reflector.

4. An antenna system according to claim 1, wherein the collimation reflector is a corrugated reflector.

5. An antenna system according to claim 1, wherein said source emits an electron beam, said collimation reflector is located immediately downstream of the source, and is provided with a central hole allowing said electron beam to pass therethrough.

6. An antenna system according to claim 1, wherein said partial mode converter comprises means for forming a mode mixture wave containing both $T_{m,n-1}$ and $T_{m,n+1}$ additional modes of approximately equal power rates.

* * * * *